United States Patent
Cummins

(10) Patent No.: US 6,236,995 B1
(45) Date of Patent: May 22, 2001

(54) DISTRIBUTED OBJECT SYSTEM WITH DEADLOCK PREVENTION

(75) Inventor: Fred Arthur Cummins, Farmington Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/016,467

(22) Filed: Jan. 30, 1998

Related U.S. Application Data

(60) Provisional application No. 60/065,400, filed on Nov. 13, 1997.

(51) Int. Cl.[7] .................................................. G06F 17/30
(52) U.S. Cl. ................................ 707/8; 707/200; 707/202
(58) Field of Search .................................. 707/8, 1, 200, 707/202, 201; 710/200; 709/104, 203, 205

(56) References Cited

U.S. PATENT DOCUMENTS

| | | | | |
|---|---|---|---|---|
| 5,377,351 | * | 12/1994 | Kotera et al. ......................... | 395/650 |
| 5,764,976 | * | 6/1998 | Hsiao ........................................ | 707/8 |
| 5,799,305 | * | 8/1998 | Bortvedt et al. ....................... | 707/10 |
| 5,832,484 | * | 11/1998 | Sankaran et al. ......................... | 707/8 |
| 5,835,766 | * | 11/1998 | Iba et al. ............................... | 395/679 |
| 5,872,981 | * | 2/1999 | Waddington et al. ................ | 395/726 |
| 5,940,828 | * | 8/1999 | Anaya et al. ............................ | 707/8 |

OTHER PUBLICATIONS

Flatebo et al., Self–Stabilizing deadlock Detection Algorithms, obtained via the internet <http://www.acm.org/pubs/citations/proceedings/csc/131214/p117–flatebo, p. 117–122, Mar. 1992.*
Deitel, Operating Systems, Addison–Wesley Publishing Compant, Chapter 6 p. 153–174, Jan. 1990.*
Document entitled "Transaction Processing Concepts and Techniques" by Jim Gray and Andreas Renter, Morgan–Kaufmann, 1993, pp. 422–429.

* cited by examiner

Primary Examiner—John Breene
Assistant Examiner—Greta L. Robinson
(74) Attorney, Agent, or Firm—Baker Botts L.L.P.

(57) ABSTRACT

One aspect of the invention is a distributed object system comprising a plurality of resources and a plurality of transactions where at least some of the plurality of transactions make use of at least one of the plurality of resources. A transaction service runs on at least one computer and is operable to interact with the resources and transactions. The transaction service comprises a deadlock detector operable to determine whether deadlock will occur if one of the plurality of transactions waits to use a resource currently being used by another of the plurality of transactions. A roll back method is operable to roll back a particular transaction if the deadlock detector determines that deadlock will occur if that particular transaction waits to use a resource currently being used by another of the plurality of transactions.

13 Claims, 1 Drawing Sheet

DISTRIBUTED OBJECT SYSTEM WITH DEADLOCK PREVENTION

RELATED APPLICATIONS

This application claims the benefit of U.S. provisional application Ser. No. 60/065,400, which was filed on Nov. 13, 1997.

TECHNICAL FIELD OF THE INVENTION

This invention relates generally to object-oriented programming and more particularly to a distributed object system with deadlock prevention.

BACKGROUND OF THE INVENTION

Some computer applications are so large and the number of users of the applications so large that it makes sense to divide up the work of the application among multiple computers and, potentially, to store the information used by the application in many different places. Such applications are commonly referred to as distributed applications. Conventional distributed applications store shared information in multiple databases that may reside on many different computers.

Recently, however, software developers have begun to create distributed object systems. Distributed object systems comprise shared objects that may be accessed by one or more processes running on one or more computers. In distributed object systems, then, an additional shared resource, the distributed object, needs to be accounted for.

In a distributed object environment, objects are accessed in the context of transactions. When an object is about to be accessed in the context of a particular transaction but is already in use by another transaction, then the second transaction will often be required to wait until the first transaction has completed in order to ensure that each transaction accomplishes a logically consistent update. Variations in such a locking mechanism may allow read-only transactions to proceed, or may control locking at the level of individual object instance variables or at the level of groups of objects. In any case, when a transaction seeks to access such a locked resource, that transaction may have to wait to use that resource.

Because transactions are operating on multiple objects asynchronously, it is possible that a transaction that is about to go into a wait state may be doing so to wait for a second transaction that is already waiting on the first transaction for access to another resource. This is commonly called a deadlock as each transaction may wait for the other indefinitely.

Although some deadlock detection methods exist, these mechanisms often detect deadlock after the deadlock condition has already occurred, rather than detecting it just prior to its occurrence.

SUMMARY OF THE INVENTION

The invention comprises a distributed object system with deadlock detection and a method for preventing deadlock. One aspect of the invention is a distributed object system with a plurality of resources and a plurality of transactions where at least some of the plurality of transactions make use of at least one of the plurality of resources. A transaction service running on a computer is operable to interact with the resources and transactions. The transaction service comprises a deadlock detector operable to determine whether deadlock will occur if one of the plurality of transactions waits to use a resource currently being used by another of the plurality of transactions. The transaction service further comprises a roll back method operable to roll back a particular transaction if the deadlock detector determines that deadlock will occur if that particular transaction waits to use a resource currently being used by another of the plurality of transactions.

The invention has several important technical advantages. The invention allows potential deadlock to be detected easily and efficiently. The invention does not require the transaction service to maintain complicated data about each transaction to use for deadlock detection. Instead, the invention employs a limited amount of data to use for this purpose. The invention detects deadlock just prior to its occurrence, avoiding an actual deadlock condition. When deadlock is detected, the transaction that would cause deadlock if it was placed into a wait state is simply rolled back to allow the relevant transaction to proceed. Thus, the invention avoids deadlock with the simple roll back of a single transaction.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
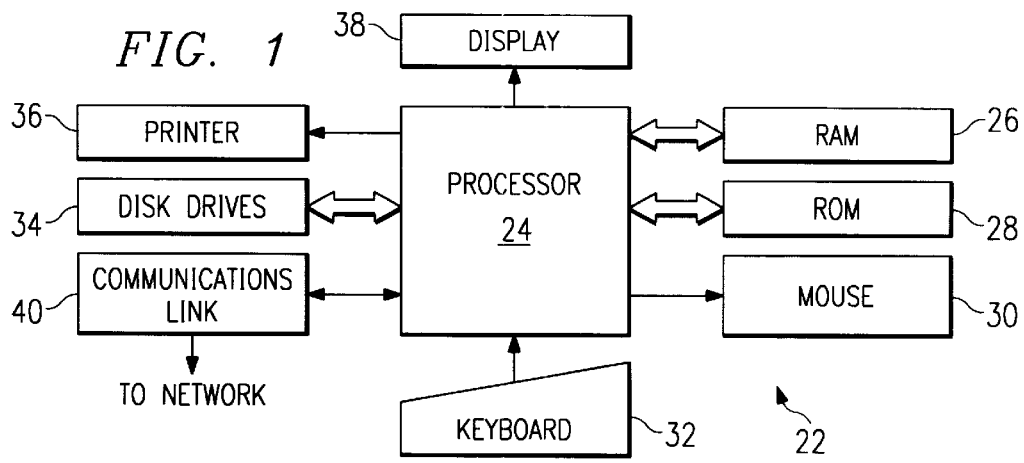
FIG. 1 illustrates an exemplary general purpose computer that may be used to implement the present invention.
Figure 2:
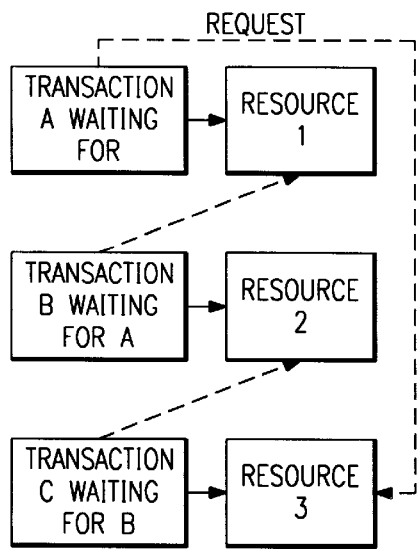
FIG. 2 illustrates an exemplary distributed object system constructed in accordance with the invention.
Figure 3:
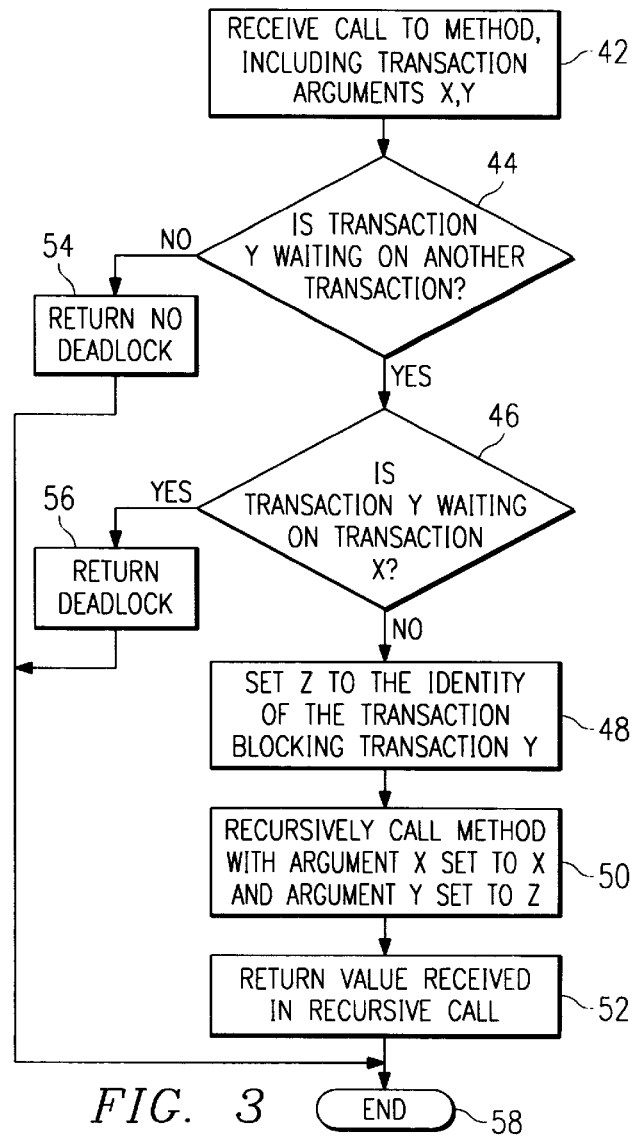
FIG. 3 illustrates the operation of an exemplary deadlock detection method constructed in accordance with the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may be adapted to execute any of the well known OS2, UNIX, MAC-OS, and WINDOWS operating systems or other operating systems. General purpose computer 22 comprises processor 24, random access memory (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antenna, a gateway or any other type of communications link. Disk drives 34 may include a variety of types of storage media, such as, for example, floppy disk drives, hard disk drives, CD ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used in computers other than general purpose computers, as well as on general purpose computers without conventional operating systems.

FIG. 2 illustrates an exemplary distributed object system constructed in accordance with the invention. Although the invention may be used in any system employing shared resources, it is particularly useful in distributed object systems. As illustrated, the distributed object system comprises a plurality of transactions and a plurality of resources. In this example, three transactions are illustrated that are seeking to make use of three resources. More or less transactions and/or resources may be included without departing from the scope of the invention. The number of transactions active in a particular distributed object system will ordinarily vary during the operation of the system. Similarly, the number of active resources may vary during the operation of the system. A resource may refer to any type of resource such as an object, a printer interface, a database interface, etc.

The distributed object system comprises a plurality of computers such as, for example, general purpose computers 22, networked together. Any number of computers may be used without departing from the scope of the invention. Computers in the distributed object system carry out the transactions and control the resources of the system.

In a distributed object environment, a transaction generally refers not to an individual transaction with a database but to an object transaction comprising a unit of work such that all of the work is either made permanent as a group or rolled back together. Thus, a particular object transaction may involve one or more database operations, some with a single database and others with multiple databases. In this embodiment, a transaction service, which may itself be distributed or centralized, controls the operation of the transactions.

The transaction service runs on at least one computer and interacts with the resources and transactions. The transaction service comprises a deadlock detector operable to determine whether deadlock will occur if one of the transactions waits to use a resource currently being used by another transaction. The transaction service may also roll back a particular transaction if the deadlock detector determines that deadlock will occur if that particular transaction waits to use a resource currently being used by another transaction. The roll back occurs using conventional methods. The transaction service may comprise one or more objects and the deadlock detector and roll back methods comprise one or more methods of the objects making up the transaction service.

When a process such as a client process (not explicitly shown) initiates a transaction, the transaction service creates a controller object, a terminator object, and a coordinator object to manage the transaction. Any type of arrangement may be used for transaction management, however, without departing from the scope of the invention.

In this embodiment, a transaction that is waiting for another transaction to finish using a resource maintains a record of the identification of the transaction it is waiting for as well as the resource that it is waiting for. In this embodiment, the objects handling the management of a particular transaction maintain this information. Alternatively, the transaction service could maintain this information for all currently active transactions.

Again, a resource could be any type of resource. In this embodiment, a resource will most commonly be a distributed object that can be shared by multiple processes. Alternatively, a resource could comprise an instance variable of a particular object or a group of instance variables.

Similarly, a resource could comprise a group of distributed objects or other types of objects rather than a single object. Other resources could also be controlled by the distributed object system without departing from the scope of the invention.

In operation, a transaction seeks access to a particular resource. If the resource is available, then the transaction is allowed to use the resource and an appropriate locking mechanism may prevent the resource from being used by other transactions. When a resource is unavailable, the transaction may request deadlock detection through the transaction service. If the resource is not available, then the transaction service determines whether a deadlock will be created if the transaction requesting the resource is suspended to wait for the resource to become available. If a deadlock is detected, then the transaction is rolled back to allow other transactions to complete thus preventing a deadlock condition from occurring. If the transaction can wait for the resource without creating a deadlock condition, then the first transaction is suspended until the resource becomes available. An example method of detecting deadlock in accordance with the invention will be discussed in more detail below in connection with FIG. 3.

The example in FIG. 2 may be used to illustrate the detection of a potential deadlock condition. In FIG. 2, transaction C is using resource 3 but is currently suspended and waiting for transaction B to finish using resource 2. Transaction C's use of resource 3 is indicated by the solid arrow while transaction C's request to use resource 2 is indicated by the broken arrow. Similarly, transaction B is currently using resource 2 but is suspended and waiting for process A to finish using resource 1. Transaction A is currently using resource 1 and has just issued a request to access resource 3.

When transaction A requests to access resource 3, the transaction service will determine whether deadlock will occur if transaction A waits for resource 3 to become available as resource 3 is currently in use by transaction C. The deadlock determination may be made using a deadlock detector method such as a deadlock detector method operating in accordance with the steps described in connection with FIG. 3. Here, deadlock will be detected because transaction A would be waiting on transaction C. Transaction C is already waiting for transaction B which, in turn, is waiting for transaction A. Thus, transaction A would be indirectly waiting for itself, thus creating deadlock.

Accordingly, the response of the transaction service to transaction A's request to access resource 3 will be to detect deadlock and roll back transaction A to allow transactions B and then C to proceed. This limited roll back solves potential deadlock problems with the roll back of only a single transaction.

Although the invention may be used to prevent many cases of deadlock, other types of deadlock could occur in a system and prevention by the invention is not absolute. For example, the invention may be difficult to integrate with existing systems or system components that do not have facilities built in to interface with the invention. Thus, the invention may be used with other deadlock detection methods for handling additional forms of deadlock.

FIG. 3 illustrates the operation of a deadlock detection method constructed in accordance with the invention. This method recursively determines whether a deadlock condition will occur if a transaction waits for a resource that is currently in use by another transaction.

In step 42, a call is received to the method including transaction arguments X and Y. The transaction X argument comprises the identity of the transaction that generated the request for the resource and will be suspended if such suspension would not create deadlock. The transaction Y argument comprises the transaction that is currently using the resource that transaction X desires to use and has just generated a request to use. Accordingly, when the deadlock detection method is invoked, the identify of these two transactions are passed as arguments of the method.

After the method has been invoked, it is determined in step 44 if transaction Y is waiting on another transaction. If not, then no deadlock will occur if transaction X is forced to wait and a no deadlock condition is returned in step 54.

If transaction Y is waiting on another transaction, then it is determined in step 46 if transaction Y is waiting on transaction X. If transaction Y is waiting on transaction X, then a deadlock condition will occur if transaction X is suspended. Accordingly, a deadlock condition indication is returned in step 56.

If transaction Y was not waiting on transaction X in step 46, then in step 48 a variable Z is set to the identity of the transaction that is blocking transaction Y. Next, in step 50, the method whose operation is illustrated in FIG. 3 recursively calls itself with the argument X set to the X value that was received when the method was originally invoked and with argument Y set to the value of Z that was established in step 48. Then, in step 52, the value received in response to the recursive call is returned and the method terminates in step 58.

To clarify the operation of the deadlock detection method, the example potential deadlock illustrated in FIG. 2 will be detected using the deadlock detect method whose operation is illustrated in FIG. 3. Because transaction A seeks to access resource 3 and resource 3 is currently being used by transaction C, the initial call to the deadlock detector that is received in step 42 would have transaction A as argument X and transaction C as argument Y. During this first call to the deadlock detection method, the result of the test in step 44 would be to proceed to step 46 because transaction C is waiting on another transaction. The result of the test in step 46 would be to proceed to step 48 because transaction C is not waiting on transaction A. In step 48, Z would be set to the value of transaction B because transaction B is blocking transaction C. The method would then be recursively called with argument X set to transaction A and argument Y set to transaction B.

The first recursive call would be received in step 42. The result of the test in step 44 would be to proceed to step 46 because transaction B is waiting on transaction A. In step 46, it would be determined that transaction B is indeed waiting on transaction A so a deadlock condition would be returned in step 56 and the method terminated in step 58.

The return of the deadlock condition from the recursive call to the method would result in the resumption of the execution of the first call to the method in step 52. In step 52, the original call to the method would result in the return of the deadlock indication received as a return value when the method was recursively called. The original method would then complete in step 58.

Although the present invention has been described in detail, it should be understood that various changes, substitutions and alterations can be made hereto without departing from the spirit and scope of the invention as defined by the appended claims.

What is claimed is:

1. A method for preventing deadlock among multiple transactions, comprising:

attempting with a first transaction to access a resource already in use by a second transaction;

determining if a deadlock will be created if the first transaction waits for the resource, the determination made using a deadlock detection method, the deadlock detection method receiving a transaction x argument and a transaction y argument, the deadlock detection method invoked initially with transaction x set to the first transaction and transaction y set to the second transaction, the method comprising if transaction y is not waiting on another transaction, then indicate no deadlock, else if transaction y is waiting on transaction x, then indicate deadlock, else set z to the identity of the transaction blocking transaction y and recursively call the deadlock detection method with transaction x argument set to the value of transaction x received initially and the transaction y argument set to z;

rolling back the first transaction if deadlock was indicated by the deadlock detection method.

2. The method of claim 1, further comprising:

suspending the first transaction until the resource becomes available if no deadlock was indicated by the deadlock detection method.

3. The method of claim 1, wherein each transaction maintains an identification of the transaction it is waiting for.

4. The method of claim 1, wherein the resource comprises a distributed object.

5. The method of claim 1, wherein the multiple transactions comprise transactions in a distributed object system.

6. The method of claim 1, wherein the resource comprises an instance variable of a distributed object.

7. A distributed object system, comprising:

a plurality of resources;

a plurality of transactions in a distributed object system, at least some of the plurality of transactions making use of at least one of the plurality of resources;

a transaction service running on at least one computer and operable to interact with the resources and transactions, the transaction service comprising a deadlock detector operable to determine whether deadlock will occur if one of the plurality of transactions waits to use a resource currently being used by another of the plurality of transactions, wherein the deadlock detector comprises software receiving a transaction x argument and a transaction v argument, the deadlock detector invoked initially with transaction x set to a first transaction seeking to use a resource and transaction y set to a second transaction currently using the resource, the deadlock detector further operable to indicate no deadlock if transaction y is not waiting on another transaction, indicate deadlock if transaction y is waiting on transaction x, otherwise set z to the identity of the transaction blocking transaction v and recursively call the deadlock detector with transaction x argument set to the value of transaction x received initially and the transaction y argument set to z; and a rollback method operable to roll back a particular transaction if the deadlock detector determines that deadlock will occur if that particular transaction waits to use a resource currently being used by another of the plurality of transactions. an identification of the transaction it is waiting for.

8. The distributed object system of claim 7, wherein each transaction maintains an identification of the transaction it is waiting for.

9. The distributed object system of claim 7, wherein the transaction service is further operable to maintain, for each transaction waiting to use a resource currently being used by another transaction, an identification of the transaction that the waiting transaction is waiting for.

10. The distributed object system of claim 7, the transaction service further operable to suspend the first transaction until the resource becomes available if no deadlock was indicated by the method.

11. The distributed object system of claim 7, wherein each resource comprises a distributed object.

12. The distributed object system of claim 7, wherein each resource comprises an instance variable of a distributed object.

13. The distributed object of claim 10, wherein each resource comprises a distributed object.

* * * * *